United States Patent [19]
Helfritch

[11] Patent Number: 4,832,806
[45] Date of Patent: May 23, 1989

[54] RADIATION FOR THE SELECTIVE DESTRUCTION OF TOXIC MOLECULES ON SOLID SURFACES

[75] Inventor: Dennis J. Helfritch, Somerville, N.J.

[73] Assignee: Research-Cottrell, Inc., Somerville, N.J.

[21] Appl. No.: 69,023

[22] Filed: Jul. 1, 1987

[51] Int. Cl.⁴ .............................................. B01J 19/12
[52] U.S. Cl. ......................... 204/157.44; 204/157.48; 204/157.63
[58] Field of Search ...................... 204/157.44, 157.47, 204/157.48, 157.63

[56] References Cited

U.S. PATENT DOCUMENTS

| | | | |
|---|---|---|---|
| 3,100,182 | 8/1963 | Erdman et al. | 204/154 |
| 3,147,213 | 9/1964 | Byron et al. | 210/1 |
| 3,553,089 | 1/1971 | Mytelka | 204/157.1 |
| 4,294,674 | 10/1981 | Aoki et al. | 204/157.1 H |
| 4,345,983 | 8/1982 | Wan | 204/158 R |
| 4,372,832 | 2/1983 | Bush | 204/157.1 R |
| 4,406,762 | 9/1983 | Ray et al. | 204/157.1 H |
| 4,632,742 | 12/1986 | Tundo | 204/158.21 |

Primary Examiner—John F. Niebling
Assistant Examiner—Isabelle Rodriquez
Attorney, Agent, or Firm—Kerkam, Stowell, Kondracki & Clarke

[57] ABSTRACT

A method is disclosed for the distruction of toxic materials adsorbed on large masses of non-toxic materials by subjecting a mixture of the materials to a high power electron beam or to gamma rays.

3 Claims, 1 Drawing Sheet

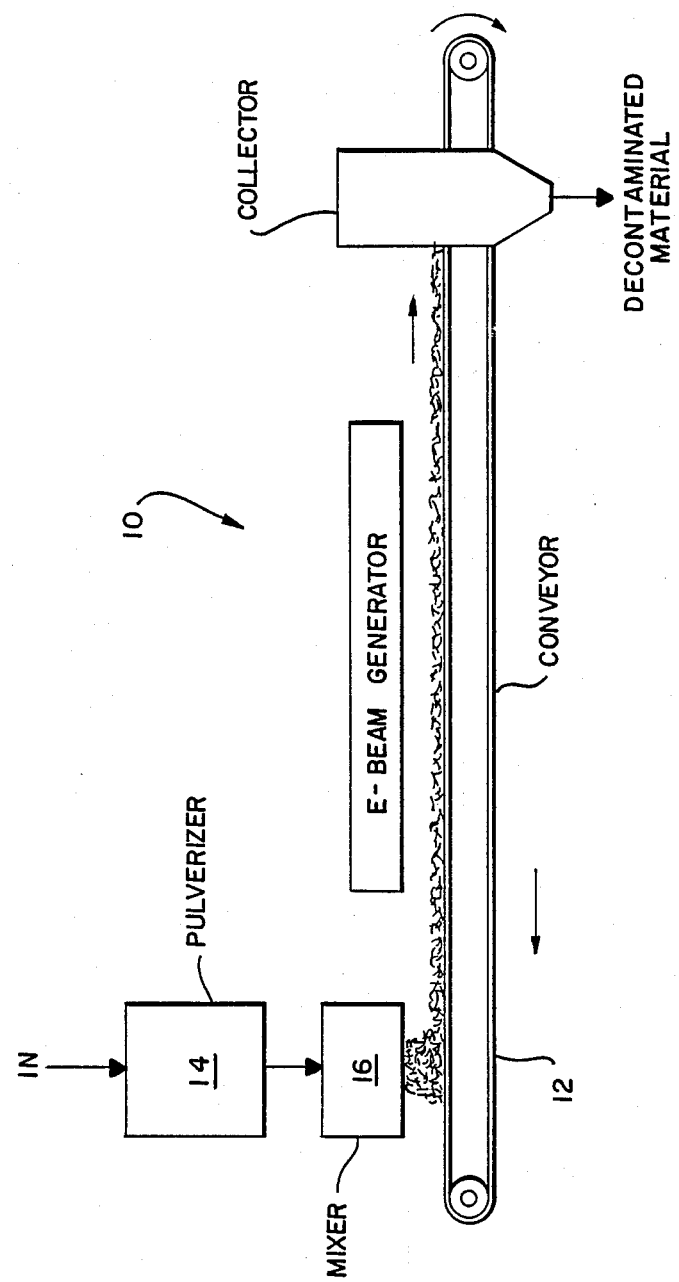

RADIATION FOR THE SELECTIVE DESTRUCTION OF TOXIC MOLECULES ON SOLID SURFACES

BACKGROUND OF THE INVENTION

The problem of toxic and hazardous material disposal is often exacerbated when the toxic material is distributed throughout a much larger mass of non-toxic material, such as the case when soil contains trace quantities of PCB's. Two approaches currently exist for the disposal of such toxic/non-toxic mixtures. The toxic molecule can be decomposed by subjecting it to high temperatures via an incineration process or the toxic material can be placed in perpetual storage in some isolated location. Often the non-toxic component of the mixture exceeds the mass of the toxic component by a ratio larger than a million. Since the materials cannot be separated, the entire mixture must be subjected to the incineration or storage process, leading to extremely high disposal cost per unit mass of toxic material.

Ionizing radiation can also be used to decompose toxic molecules, but this technique appears to have the same drawback as incineration, since the entire toxic/non-toxic mixture must be processed. When a mixture of materials is irradiated, the radiative energy is absorbed by the components of the mixture in the proportion of the mass of each component. Thus, if soil containing one part per million of PCB is irradiated, the PCB would absorb only one millionth of the total incident energy.

Examples of prior art patents directed to decomposition and decontamination of materials are the following:

U.S. Pat. No. 4,345,983 Wan
U.S. Pat. No. 3,147,213 Byron et al
U.S. Pat. No. 3,553,089 Mytelka et al
U.S. Pat. No. 4,294,674 Aoki et al
U.S. Pat. No. 4,406,762 Ray et al
U.S. Pat. No. 4,372,832 Bush
U.S. Pat. No. 4,632,742 Tundo

SUMMARY OF THE INVENTION

The invention may be generally defined as a method for the destruction of toxic materials adsorbed on certain non-toxic materials subjecting a mixture of the materials to an electron beam or to gamma rays.

BRIEF DESCRIPTION OF THE DRAWING

The drawing diagrammatically illustrates apparatus for carrying out the invention.

DESCRIPTION OF PREFERRED EMBODIMENTS

It has been discovered that for some materials such as the oxides of silicon or iron or calcium radiation produces electronic excitation in the solid non-toxic and this excitation energy is transferred to the absorbed toxic material where it is utilized for molecular decomposition. This energy transfer can be so efficient that greater toxic molecule destruction per unit radiation energy input can be achieved when the toxic/non-toxic mixture is irradiated than when the pure toxic material is irradiated. Thus, through the use of radiation, energy can be applied to a large quantity of non-toxic material which contains adsorbed trace quantities of toxics, and most of the applied energy will be selectively utilized for toxic molecule destruction.

In practice, any ionizing radiation can be utilized. However the two sources most commonly used for radiation are cobalt-60 gamma rays and high power electron beam. Beam power in excess of 10,000 watts is desirable.

In order to process large quantities of material, the electron beams would be more practical, due to their higher energy output. For organic molecule decomposition, the yield, or G-value, is typically one to ten molecules per 100 electron volts of applied energy. For PCB with a molecular weight of 189, assuming a G-value of 1, and assuming 50% transfer of energy from the non-toxic material, the energy utilization for the destruction of the PCB would be $10^5$ joule/gm or 43,000 Btu/lb. If energy transfer did not take place and the toxic/non-toxic mixture ratio were 2 parts per million, then the energy utilization for the toxic destruction would be $10^{10}$ joule/gm.

This method for the destruction of adsorbed toxic materials on large masses of non-toxics can be used to treat soil contaminated by toxic spills. The soil could be distributed on a belt conveyor and passed under an electron beam. Applied radiation energy could be adjusted by the altering of the belt speed or the beam current.

This method can also be used to treat filtration materials which have filtered liquids or gases containing toxics. In this case the toxic materials trapped on the filter surfaces could be destroyed by radiation and the filter could be placed back into service.

10 generally designates apparatus suitable for carrying out the process of the invention. The apparatus illustrated consists of a belt conveyor 12 traveling in the direction of the directional arrows. The mixture of contaminated materials are pulverized in the pulverizer 14 thence, where necessary, the pulverized material feeds to a mixer 16 which deposits the pulverized and mixed materials on the top flight of the conveyor 12. The conveyor 12 moves the material under the E-beam generator thence the material is conveyed to a collector which may be of sufficient area to store the material a sufficient time for the electron beam energy to decompose the toxic material. There after, the decontaminated toxic material may be returned to its original environment or otherwise disbursed.

I claim:

1. A method for the destruction of toxic materials adsorbed on large masses of solid non-toxic materials consisting of subjecting a mixture of the solid materials to a high power electron beam in excess of 10,000 watts or to gamma rays.

2. The methods defined in claim 1 wherein the non-toxic materials are selected from the group consisting of the oxides of silicon, iron, or calcium.

3. The method defined in claim 2 wherein the gamma rays are produced by cobalt-60.

* * * * *